United States Patent [19]

Seibel

[11] 4,079,242
[45] Mar. 14, 1978

[54] ILLUMINATING DEVICE FOR A CIGAR LIGHTER

[75] Inventor: Georg Seibel, Dreieichenhain, Germany

[73] Assignee: Schoeller & Co., Elektrotechnische Fabrik, Frankfurt am Main, Germany

[21] Appl. No.: 705,765

[22] Filed: Jul. 16, 1976

[30] Foreign Application Priority Data

Aug. 6, 1975 Germany .............................. 2535080

[51] Int. Cl.² ................................................ F21V 33/00
[52] U.S. Cl. ........................................... 362/32; 326/311
[58] Field of Search ................ 240/2 CL, 2.1, 2.17, 240/1 EL, 1 LP, 8.14, 8.16; 40/130 K

[56] References Cited

U.S. PATENT DOCUMENTS

| 2,701,297 | 2/1955 | Thibault ............................ 240/2 CL |
| 2,988,631 | 6/1961 | Hershey et al. ...................... 240/2.1 |

FOREIGN PATENT DOCUMENTS 1,381,060 1/1975 United Kingdom .............. 240/2 CL Primary Examiner—JD Miller
Assistant Examiner—Peter S. Wong
Attorney, Agent, or Firm—Toren, McGeady and Stanger

[57] ABSTRACT

An illuminating device for a cigar lighter, such as used in an automobile, includes an axially extending ring formed of a light-transmitting material which is mountable in the automobile dashboard and a housing containing a lamp for providing indirect illumination of the ring. An extension projects rearwardly from the rear end of the ring. The extension has laterally spaced ribs extending in the axial direction of the ring with a slot through the extension traversing the front ends of the ribs. The slot, in combination with the ribs, effects a division of the extension into two light conductors. The ribs interconnect the lamp housing to the ring and light flows into the ribs and through the two light conductors into the ring.

9 Claims, 9 Drawing Figures

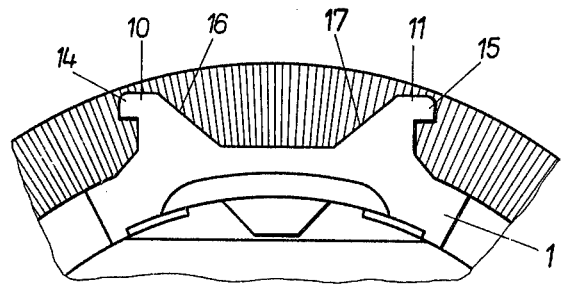
Fig. 5
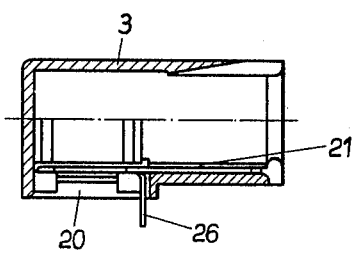
Fig. 6
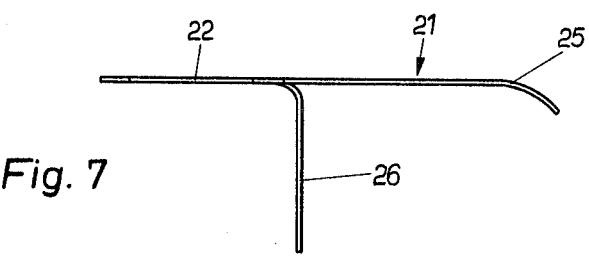
Fig. 7
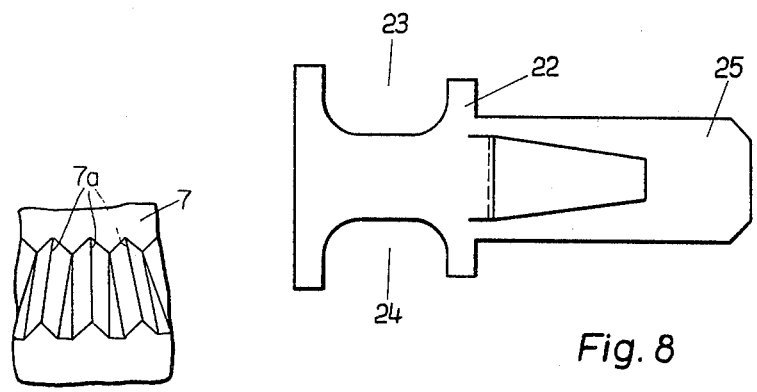
Fig. 8
Fig. 9

ILLUMINATING DEVICE FOR A CIGAR LIGHTER

SUMMARY OF THE INVENTION

The present invention is directed to an illuminating device for a cigar lighter, such as is used in an automobile, and, more specifically, it is directed to the structure interconnecting an illuminable ring and a lamp housing.

For safety reasons, particularly in automobiles, it is a requirement that the various operation elements can be seen during night driving. Accordingly, an electric cigar lighter should be visible by means of a light in the darkened vehicle to enable the driver to remove and reinsert the lighter into its socket without having to search in the dark which might cause his attention to be distracted from the road. Lighting devices are known in which the interior of the socket is flooded with light, the light only occurring when the plug-like cigar lighter is withdrawn from its socket. In other known lighting devices a transparent smooth illuminable ring is used which extends around the socket and receives light from a lamp mounted directly behind the dashboard. In this arrangement the light distribution is extremely inhomogeneous. That part of the light ring closest to the lamp displays a concentration of light while the lighting effect on the opposite side of the ring is considerably diminished. Such a lighting arrangement is extremely unfavorable because the concentrated light causes a dazzling effect and the diminished light supply affords an inadequate light distribution.

In British Pat. No. 1,381,060 an illuminating device for cigar lighters is disclosed, which includes an illuminable ring formed of a light-transmitting material which is mounted between the socket for a cigar lighter and the dashboard of an automobile. One end of the ring faces the interior of the vehicle and a lamp housing is mounted adjacent the opposite end of the ring. Means are provided between the lamp housing and the ring for transmitting a source of indirect lighting into the ring which contains prisms for dispersing the light.

In British Pat. No 1,381,060 the illuminating device is suitable for normally dimensioned cigar lighters and may be installed where there is adequate space behind the dashboard. Where such space is not available, however, the cigarette lighter must have a reduced axial length so that it can be properly mounted behind the dashboard.

Therefore, it is a primary object of the present invention to provide an illuminating device of reduced axial length so that it requires less space.

In accordance with the present invention, a cigar lighter illuminating device includes an illuminable ring formed of a light-transmitting material which is mountable between a socket for a cigar lighter and the dashboard of an automobile. The ring has a front end facing into the interior of the automobile and a rear end spaced behind the dashboard. A housing for a lamp is attached to the rear end of the ring over a light-conducting extension. Prism means provided within the ring effect the dispersement of the light conducted from the lamp in the housing through the extension into the ring. The extension has a pair of light-conducting ribs extending in the axial direction of the ring which secures the lamp housing to the ring.

By virtue of the arrangement of the ribs on the extension, a substantially shorter overall length of the device is obtained so that it can be used in an automobile having little space behind the dashboard.

An important feature of the invention is the provision of a slot formed through the extension and traversing the front ends of the ribs. Due to the arrangement of the slot, the extension is divided into two light conductors, each extending laterally outwardly from one of the ribs, for contributing to the substantially uniform light distribution into the illuminable ring. Within the lamp housings, a metal screen is positioned between the lamp and the ribs on the extension. The screen has cutouts through which light passes into inclined surfaces on the ribs. Further, the metal screen provides a ground connection from the lamp to the socket housing and it also provides a tongue which cooperates with a contact mounted on the lamp holder.

By including prisms within the ring, a uniform light distribution is afforded over the entire circumference of the ring, although the actual light source is limited to a substantially spot-like region, that is, a miniature light bulb. Due to the light distribution about the entire ring, the opening into the socket for the cigar lighter can be clearly seen in the dark. This arrangement is particularly advantageous because it is of a simple structure which can be inexpensively produced, and can be easily assembled and installed in the dashboard.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 5 is an enlarged view of that portion of the illuminating ring shown encircled and identified by V in FIG. 2;

FIG. 6 is a longitudinal sectional view through the lamp housing;

FIG. 7 is a side view of a metal screen used in the lamp housing;

FIG. 8 is a plan view of the metal screen shown in FIG. 7; and

FIG. 9 is an enlarged view of the rear surface of the illuminating ring showing the prisms thereon.

DETAILED DESCRIPTION OF THE INVENTION

Figure 1:
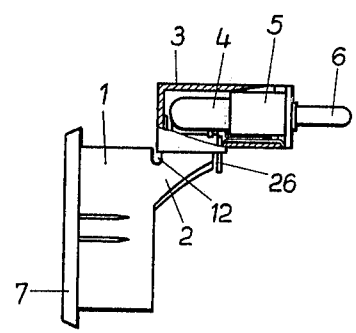
FIG. 1 is a side view, partly in section, of the illuminating device embodying the present invention and including an illuminating ring and a lamp housing.

An illuminating device is illustrated including an illuminable ring 1, that is a ring formed of light-transmitting material, having an extension 2 extending rearwardly from the rear end of the ring. As viewed in FIG. 1, the left or front end of the ring is positioned on the dashboard of an automobile while its right or rear end is located within the dashboard. Interengageably mounted on the extension 2 is a lamp housing 3 containing a lamp 4 in a lamp holder 5. The lamp holder 5 is clamped in the lamp housing 3 and has a rearwardly extending connection contact 6. Though not shown in the drawing, the interior of the ring accommodates a socket for a cigar lighter and, in use, is clamped with the socket in an opening in the dashboard, not shown, of an automobile. At its front end, the ring 1 has a flange 7 which abuts against the dashboard and the rear end of the flange is provided with prisms for affording uniform light distribution throughout the ring.

Figure 2:
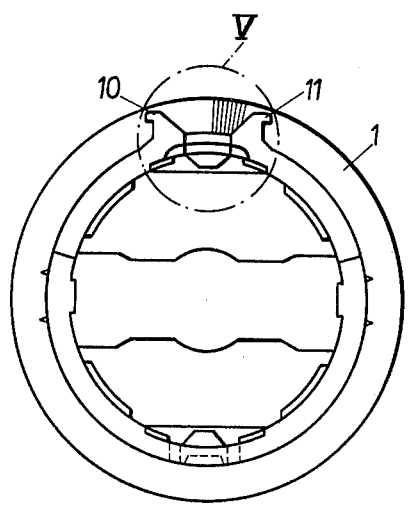
FIG. 2 is an end view of the illuminating ring shown in FIG. 1.
Figure 4:
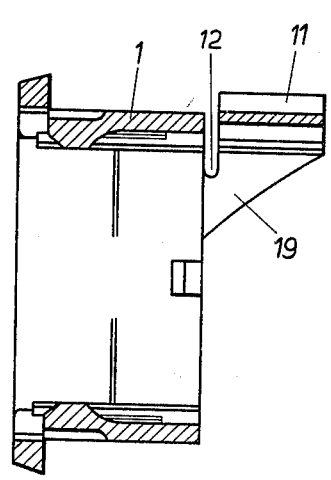
FIG. 4 is a longitudinal sectional view of the illuminating ring shown in FIGS. 2 and 3.
Figure 3:
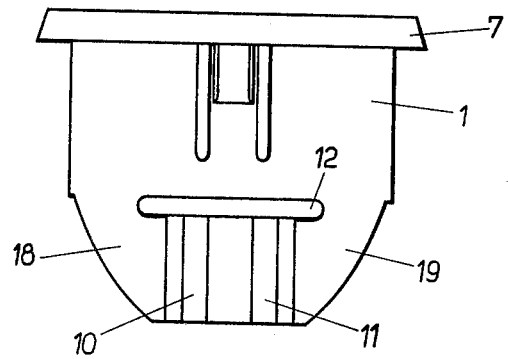
FIG. 3 is a top view of the ring shown in FIG. 2.

As shown in FIGS. 2 to 5, two ribs are provided on and extend upwardly from the extension 2. The ribs 10, 11 extend in the axial direction of the ring. As shown in FIGS. 2 and 5, each rib has a lateral extension 14, 15 extending outwardly in the direction away from the other rib. Adjacent the rear end of the ring, a slot 12 extends through the extension 2, traversing the front ends of the ribs 10 and 11 for dividing the extension into two light conductors 18 19. Each of the light conductors 18, 19 extends laterally outwardly from the outwardly facing surfaces of the ribs, that, is the surfaces of the ribs which face outwardly away from one another. The opposite or inwardly facing surfaces 16, 17 of the ribs are inclined, note FIG. 2, and taper inwardly toward one another in the direction toward the axis of the ring. Light from the lamp 4 is directed onto the inclined surfaces 16, 17 of the ribs 10, 11 and then is transmitted through the extension into the two light conductors 18, 19 of the extension 2. From the light conductors 18, 19 which, as can be seen in FIGS. 1 and 3, form a continuation of the surface of the ring, the light passes into the ring and is transmitted to the prisms 7a located on the rear surface of the flange 7 Note FIG. 9, for distribution over the entire circumference of the flange so that a uniform lighting effect is afforded around the socket opening in the dashboard.

In FIG. 6 an axially extending section through the lamp housing 3 is illustrated. The lateral projections 14, 15 on the ribs 10, 11 of the extension interengage within the opening 20 in the lamp housing and are securely clamped therein against corresponding locating members in the housing. A metal screen 21 is inserted within the lamp housing 3 so that it is located in the path of the light from the lamp 4 into the extension 2. The housing is closed at its forward end, that is, the end directed toward the flange 7 of the ring 1 so that the light is directed downwardly toward the opening 20. While the screen extends across the opening 20, as can be seen in FIGS. 7 and 8, it consists of a metal trip 22 having cutouts 23, 24 in its sides extending in the axial direction of the ring, for the passage of light from the lamp 4 through the opening 20 onto the inclined surfaces 16, 17 of the ribs. The metal strip 22 has a rearwardly extending tongue 25 from which a contact lug 26 is stamped and bent, relative to the tongue, through 90°. The tongue 25 cooperates with a contact in the lamp holder 5 while the contact lug 26 is connected to ground.

While a specific embodiment of the invention has been shown and described in detail to illustrate the application of the inventive principles, it will be understood that the invention may be embodied otherwise without departing from such principles.

What is claimed is:

1. An illuminating device for cigar lighters such as used in an automobile, comprising an illuminable axially extending ring formed of light-transmitting material having a front end and a rear end spaced apart in the axial direction of the ring and mountable in the dashboard of an automobile between the dashboard and the socket for a cigar lighter so that the front end is located at the dashboard facing the interior of the automobile, a lamp housing mounted on said ring adjacent the rear end thereof, a lamp holder positioned within said lamp housing and a lamp positioned within said lamp holder, means interposed between said housing and said ring for providing indirect illumination from said lamp into said ring, and prism means located in said ring for dispersing light therein, said means for providing indirect illumination comprises an extension secured to and extending rearwardly of the rear end of said ring in the axial direction of said ring, said extension serving as a light conductor between said lamp in said lamp housing and the rear end of said ring, wherein the improvement comprises that said extension includes a pair of light conducting ribs extending outwardly from said extensions, said lamp housing having an opening therein, said ribs being shaped to interengage within the opening in said lamp housing for securing said lamp housing to said ring.

2. An illuminating device for cigar lighters such as used in an automobile, comprising an illuminable axially extending ring formed of light-transmitting material having a front end and a rear end spaced apart in the axial direction of the ring and mountable in the dashboard of an automobile between the dashboard and the socket for a cigar lighter so that the front end is located at the dashboard facing the interior of the automobile, a lamp housing mounted on said ring adjacent the rear end thereof, a lamp holder positioned within said lamp housing and a lamp positioned within said lamp holder, means interposed between said housing and said ring for providing indirect illumination from said lamp into said ring, and prims means located in said ring for dispersing light therein, said means for providing direct illumination comprises an extension secured to and extending rearwardly of the rear end of said ring in the axial direction of said ring, said extension serving as a light conductor between said lamp in said lamp housing and the rear end of said ring, wherein the improvement comprises that said extension includes a pair of light conducting ribs with said ribs being shaped to interengage with said lamp housing for securing said lamp housing to said ring, said ribs extending in the axial direction of said ring and being spaced laterally apart, each of said ribs having a front end adjacent to the rear end of said ring and a rear end spaced more remote from the rear end of said ring, and a first axially extending surface facing toward the other said rib and a second axially extending surface facing away from said rib.

3. An illuminating device, as set forth in claim 2, wherein said extension has a slot therethrough extending transversely of the axial direction of said ring, said slot disposed across the front ends of said ribs, and said extension having parts thereof each extending laterally outwardly from a different one of the second axially extending surfaces of said ribs and said parts each providing a separate light conductor to said ring.

4. An illuminating device, as set forth in claim 2, wherein each of said ribs has a lateral projection extending from the second surface thereof away from the other said rib, and said lamp housing having an opening therein arranged to receive said lateral extensions for securing said lamp housing to said extension.

5. An illuminating device, as set forth in claim 4, wherein said extension has a configuration extending transversely of the axial direction of said ring conforming to the transverse configuration of said ring, said ring having an inwardly facing surface directed toward the axis thereof and an oppositely directed outwardly facing surface, said extension having an inwardly facing surface oriented in the same direction as the inwardly facing surface of said ring and an outwardly facing surface oriented in the same direction as the outwardly facing surface of said ring, said ribs extending outwardly from the outwardly facing surface of said extension and said parts of said extension extending as continuations of said ring.

6. An illuminating device, as set forth in claim 5, wherein the inwardly facing surfaes of said ribs are inclined tapering inwardly toward the axis of said ring and said inwardly facing surfaces facing toward said lamp in said lamp housing for receiving light therefrom for transmitting the light to said parts forming said light conductors of said extension, 7. An illuminating device for cigar lighters such as used in an automobile, comprising an illuminable axially extending ring formed of light-transmitting material having a front end and a rear end spaced apart in the axial direction of the ring and mounted in the dashboard of an automobile between the dashboard and the socket for a cigar lighter so that the front end is located at the dashboard facing the interior of the automobile, a lamp housing mounted on said ring adjacent the rear end thereof, a lamp holder positioned within said lamp housing and a lamp positioned within said lamp holder, means interposed between said housing and said ring for providing indirect illumination from said lamp into said ring, and prism means located in said ring for dispersing light therein, said means for providing indirect illumination comprises an extension secured to and extending rearwardly of the rear end of said ring in the axial direction of said ring, said extension serving as a light conductor between said lamp in said lamp housing and the rear end of said ring, wherein the improvement comprises that said extension includes a pair of light conducting ribs with said ribs being shaped to interengage with said lamp housing for securing said lamp housing to said ring, said lamp housing having an opening therethrough for directing light from said lamp into said extension, metal screen inserted in said lamp housing between said lamp and the opening from said lamp housing, said metal screen extending in the axial direction of said ring and said screen having a lug stamped therefrom and extending at substantially right angles to said screen for forming a ground connection.

8. An illuminating device, as set forth in claim 7, wherein said lamp holder has a contact thereon, said metal screen has a tongue extending in the axial direction of said ring and said tongue forms a contact cooperating with said contact on said lamp holder.

9. An illuminating device, as set forth in claim 8, wherein said metal screen has a cutout in each of the axially extending sides thereof located forwardly of said tongue and said cutouts arranged between said lamp and the opening from said lamp housing for directing light from said lamp to said parts of said extension forming said light conductors.

* * * * *

UNITED STATES PATENT OFFICE
CERTIFICATE OF CORRECTION

Patent No. 4,079,242     Dated MARCH 14, 1978

Inventor(s)  -GEORG SEIBEL-

It is certified that error appears in the above-identified patent and that said Letters Patent are hereby corrected as shown below:

In the heading of the Patent, [73] should read as follows:

[73]  Assignee:

Schoeller & Co. Elektrotechnische Fabrik, GmbH & Co., Frankfurt/Main, Germany

Signed and Sealed this

Eighteenth Day of July 1978

[SEAL]

Attest:

RUTH C. MASON
Attesting Officer

DONALD W. BANNER
Commissioner of Patents and Trademarks